United States Patent Office 3,632,745
Patented Jan. 4, 1972

3,632,745
CONCENTRATION AND PURIFICATION OF INFLUENZA VIRUSES
Kostadin Apostolov, 183–193 Euston Road, London NW. 1, England
No Drawing. Filed Feb. 9, 1968, Ser. No. 704,216
Claims priority, application Great Britain, Feb. 21, 1967, 8,232/67
Int. Cl. A61k 27/00
U.S. Cl. 424—89
11 Claims

ABSTRACT OF THE DISCLOSURE

Viruses of the influenza group are concentrated and purified by dialysing a suspension of the virus against water containing a bivalent metallic cation concentration of from about 0.003 to about 0.12 M until the virus forms a precipitate and then separating the fraction containing the virus. The dialysis can be followed by electrical conductivity or chloride content measurements of the suspension.

---

This invention relates to the production of vaccines containing influenza viruses, and in particular to purified and concentrated suspensions of such viruses.

It has been known that viruses of the influenza group, such as the *Myxovirus influenzae*–A, *influenzae*–B, or *influenzae*–C, may, for instance, be grown on a chick embryo, monkey kidney or calf kidney tissue culture, or conveniently in embryonated hen's eggs. Tissue culture fluids or allantoic fluid, as harvested, contain considerable amounts of non-viral protein and much research effort has been spent to provide means of separating the virus from these other materials. In addition, concentration of the virus must be achieved in order to provide sufficient viral antigen in a convenient vaccine dose.

Methods using ultracentrifugation, adsorption to barium sulphate or precipitation with ammonium sulphate or organic solvents have, for example, been suggested or used to obtain the virus in a concentrated and preferably purified form suitable for use in a vaccine after inactivation. Ultracentrifugation however, requires very expensive specialised equipment and preferably the use of density gradients for satisfactory separation, and cannot be scaled up without considerable further expense. Neither adsorption nor precipitation is sufficiently selective, since large amounts of various proteins tend to be adsorbed, eluted or precipitated together with the virus, which is also a proteinaceous substance.

It has now been found that viruses of the influenza particular group can advantageously be precipitated from crude aqueous suspensions by means of dialysis. Unexpectedly, the removal of some "crystalloid materials" reduces the stability of the virus in a selective manner enabling the virus to be precipitated first and thereby separated from the subsequently precipitated other proteinaceous impurities. In this context the term "crystalloid materials" is to denote materials in the crude virus suspension, which can diffuse through a semi-permeable membrane. These materials include inorganic salts and probably organic impurities of low molecular weight. Apparently, crystalloid materials influence the solubility of larger molecular weight particles, such as viruses, and their relative amount may be indicated by the conductivity of the solution.

The advantageous and selective separation and purification of the virus are thus attained by the removal of such crystalloid materials to the extent which enables the virus particles to precipitate from the solution. The virus may then be collected in a fraction representing a tenth to a fiftieth of the original volume with a virus activity to protein ratio increased by a factor of at least 10.

A further improvement may be obtained by adjusting the concentration of bivalent cations in the dialysis liquid, such as calcium, magnesium, barium or cobalt, to a value within a specified range. It has been found that the precipitation of the viruses is more complete, if these cations are not completely removed from the medium containing the viruses.

According to the present invention, therefore, in one aspect there is provided a method for the concentration and purification of the viruses of the influenza group, which comprises dialysing a suspension of the virus to a sufficient extent enabling the virus to form a precipitate and separate the fraction containing the virus from the supernatant solution. In a particular aspect, the method, as hereinbefore defined, comprises adjusting the concentration of bivalent metallic cations in the dialysis liquid to a value from 0.003 to about 0.012 M. In a further aspect the method as hereinbefore defined is used in the process producing the vaccine containing such purified influenza viruses.

For the purposes of the present invention any suitable growth medium may be used to provide the initial suspension of the virus, but allantoic fluids obtained from embryonated hen's eggs have been preferred. The fluid is usually clarified by low speed centrifugation (1600 g.) to remove particulate matter and blood cells before dialysis.

The dialysis liquid is usually water adjusted with a buffer to a suitable pH value, which preferably has a bivalent metallic cation content as defined above. Conveniently tap water may be used, the hardness value of which corresponds to the specified range. Best results were obtained with the concentration adjusted to about 0.01 M. The anions accompanying these cations, may be any innocuous anion, such as chloride, sulphate etc.

Any suitable equipment may be used for dialysing. On a small scale semi-permeable cellophane tubing is satisfactory, and on larger scale the so-called kidney machine, originally designed to purify blood, has been found convenient for use. The ratio of the dialysing surface to the volume of liquid was around 1.6 cm.$^{-1}$ in the case of the cellophane tubing, and 4.5 cm.$^{-1}$ for the kidney machine. Tap water adjusted to a pH between 5 and 9 with a Sorensen buffer is circulated outside the membrane and the conductivity of the virus suspension, or any other physical property correlated with conductivity, is regularly measured or monitored, if necessary.

The time for dialysis depends on the available membrane surface and on the temperature of the suspension. When using the above-mentioned equipment at room temperature, 3–4 hours was found to be adequate for recovering more than 80–90% of the virus activity in the precipitate. Meanwhile, the conductivity of the virus suspension drops from the initial magnitude of $10^4$ $\mu$mho/cm. to the range below $3 \times 10^3$, or frequently to the range of 2 to 10 times $10^2$ $\mu$mho/cm. The chloride content of the former allantoic fluid is correspondingly reduced from 4.25 mg./ml. to 1.3 mg./ml. or less and it is convenient to observe this instead of the conductivity of the solution, provided processing conditions have been standardised and the equivalent values for the two tests are established. The concentration of calcium and magnesium ions in the suspension may also be monitored, and the process stopped after a few hours, when this attained equilibrium with that in the dialysis liquid.

The suspension is allowed to stand after dialysis while the slow sedimentation of the virus takes place, or preferably is centrifuged to accelerate the sedimentation. The supernatant fluid is then removed, and the deposit representing the fraction rich in virus is re-suspended by means of a phosphate or citrate saline buffer of pH 7 to 8 or with a 1% trypsin solution in phosphate buffered saline. The volume of the aqueous solution used for re-suspending the virus deposit is suitably adjusted so that the purified virus suspension may still represent at least a ten fold concentration when compared with the original volume. The virus present in the concentrate usually represents at least 70%, frequently more than 90% of the original virus activity expressed in HA (haemagglutination) units.

The sedimentation appears to be quicker and more selective, when the bivalent cation level of the dialysis liquid is adjusted, as suggested. The separated sediment may be washed with water containing 0.1 M calcium and allowed to settle again before re-suspension.

Advantageously the precipitated virus sediment may be re-suspended in triammonium citrate buffer, having preferably a concentration of 0.2 M and a pH from 5.6 to 7.2. 1 ml. of such a solution may be used for every 10 ml. volume of the original virus suspension, to obtain a 10 fold concentration. The re-suspension virus may then be inactivated by means of chemical or physical agents and may be used as a vaccine after appropriate testing.

The method according to the present invention advantageously and rapidly separates and concentrates the influenza viruses by simple means without contaminating the virus suspension with salts or other agents, and without appreciable loss of virus activity. On a large scale, the method may be carried out in two or more separate stages providing two or more fractions representing various degrees of purity. The less preferred last fractions may then be subjected to a further purification or might be recycled into the process.

The concentrated vaccine is tested for activity and infectivity and its strength is adjusted to a value complying with statutory regulations. The activity is usually expressed in International Haemagglutination Units, and the potency of the vaccine is the value per millilitre. The unit and the process for carrying out the test has been defined in the "First Report of the Experts Committee on Influenza, 1953" (World Health Organisation Technical Report No. 64). Inactivation of the virus is usually carried out after purification, but the method according to the present invention can also be applied after the viruses have been inactivated at an earlier stage of the process.

The following examples illustrate the invention.

EXAMPLE 1

The allantoic fluid containing the strain of Influenza B/Eng./66 grown in 10 day old chick embryos was clarified by centrifugation at 1600 g. in an M.S.E. Multex Centrifuge (at 2500 rev./min.) for 10 minutes. The fluid was then dialysed in "Visking Tubing," (cellophane, diameter approx. 2.5 cm.) supplied by the Scientific Instrument Centre, against tap water at 37° C.

Specimens were collected at hourly intervals up to the fourth hour. They were centrifuged as above for 10 minutes and then supernatants and the deposits were collected separately.

Both of these fractions were tested for the haemagglutinin titre by the standard Takatsy micro-method. Total protein contents were determined by the method of Lowry et al., J. Biol. Chem., 1961, 193, 265–275. The deposit was obtained from specimens were resuspended to the original starting volume in Dulbecco phosphate buffer saline solution (P.B.S. "A") for testing purposes.

The conductivity of the supernatant solution was determined, and results were as follows:

| Hours dialyzed at 37° C. | International haemagglutination, units/ml. | | Protein, mg./ml. | | Conductivity, μmho/cm. supernatant |
|---|---|---|---|---|---|
| | Supernatant | Deposit | Supernatant | Deposit | |
| 0 | 1,280 | 80 | 4.39 | 0.135 | $98 \times 10^2$ |
| 1 | 320 | 320 | 3.94 | 0.135 | $14 \times 10^2$ |
| 2 | 320 | 640 | 3.95 | 0.222 | $10.5 \times 10^2$ |
| 3 | 320 | 1,280 | 3.90 | 0.289 | $8.4 \times 10^2$ |
| 4 | 160 | 1,280 | 3.74 | 0.318 | $7.3 \times 10^2$ |
| Control, 4 hours not dialysed. | 640 | 80 | 4.35 | 0.106 | $96 \times 10^2$ |

Practically all the virus activity was recovered in the deposit with about 93% of other proteins removed. The purification factor expressed as the increase of the virus to protein ratio, was 14 fold.

EXAMPLE 2

Similar results were obtained when distilled water was used for dialysis in the above Example 1, and when the allantoic fluid of embryonated eggs inoculated with the strain Influenza A/Eng./1966 and the amniotic fluid containing the strain Influenza C Taylor were processed according to the method of Example 1.

EXAMPLE 3

Influenza Type $A_2$/Eng./1966 was grown in the allantoic of 11 day old embryonated eggs and infected allantoic fluid was harvested 2–3 days later.

2.0 litres of infected allantoic fluid were dialysed against running tap-water at room temperature by circulation through a twin coil of dialysis tubing (Baxter Laboratories Disposable Coil Kidney, "Chronacoil") having a capacity of 500 ml. and a total area of 9000 cm.$^2$. The fluid was circulated at a rate of 200 ml./min. for 4 hours. During this time the conductivity of the allantoic fluid fell from $65 \times 10^2$ μhmo/cm. to $25 \times 10^2$ μmho/cm. and precipitation occurred. The precipitate was collected by centrifugation and resuspended in 1/44 of the original volume of phosphate-buffered saline containing 1% w./v. trypsin.

The original allantoic fluid had an HA titre of 32 and contained 1.25 mg. protein/ml. as measured by trichloracetic acid and titration. The concentrate titred 4096 and had a protein content of 2.5 mg./ml. The yield of virus as measured by HA was 100% and the concentrate showed a purification factor of 64-fold.

EXAMPLE 4

1.0 l. of allantoic fluid containing Influenza Type $A_2$/Eng./66 cultivated as in Example 3 was dialysed as described for 3 hours. The original fluid titred 1024 and a 25-fold concentrate, prepared as in Example 3, titred 50,000.

EXAMPLE 5

1.5 l. of allantoic fluid containing Influenza virus type B/Eng./66 was processed as described in Example 3. Dialysis was for 3 hours. The original titre was 256 and 20-fold concentrate titred 4096.

EXAMPLE 6

The concentrated virus suspension obtained in Examples 1 to 5 were inactivated by means of formaldehyde according to known methods and was adjusted to a concentration of 2500 or 5000 HA units/ml. The vaccines thus provided were shown to be satisfactory on testing.

EXAMPLE 7

Further experiments were carried out according to the method described in Example 1, the dialysis liquid being adjusted to have a certain concentration of bivalent metallic cation. Results were tabulated as follows:

| Bivalent cation concentration in dialysis liquid | International haemagglutinating, units/ml. | | Protein, mg./ml. | |
|---|---|---|---|---|
| | Supernatant | Deposit | Supernatant | Deposit |
| 0.01M Ca++ | 32 | 1,024 | 1.1 | 0.13 |
| 0.005M Ca++ | 33 | 1,024 | 1.09 | 0.13 |
| 0.01M Mg++ | 4 | 256 | 2.01 | 0.35 |
| 0.01M Ba++ | 15 | 128 | 1.79 | 0.24 |
| 0.01M Co++ | 8 | 256 | 2.11 | 0.31 |

Calcium, magnesium and barium were used as the chloride to adjust the dialysis liquid, the cobalt as a sulphate.

What I claim is:

1. A method for the concentration and purification of viruses of the influenza group which comprises dialysing a suspension of the virus against water which contains a bivalent metallic cation concentration of from 0.003 to about 0.012 M until the electrical conductivity of the suspension is reduced to $3 \times 10^3$ μmho/cm. or less, and separating the thus-precipitated virus.

2. A method according to claim 1, in which the bivalent metallic cation is calcium, magnesium, barium or cobalt, or a mixture thereof.

3. A method according to claim 1 in which the virus is an attenuated strain from the influenza group.

4. A method accoding to claim 1 in which the virus is $M.$ $influenzae$-A.

5. A method according to claim 1 in which the virus is $M.$ $influenzae$-B.

6. A method according to claim 1 in which the virus is an attenuated strain of $M.$ $influenzae$-A.

7. A method according to claim 1 in which the virus is an attenuated strain of $M.$ $influenzae$-B.

8. A method for the concentration and purification of viruses of the influenza group which comprises dialysing a suspension of the virus against water which contains a bivalent metallic cation concentration of from 0.003 to about 0.012M until the chloride content of the suspension is reduced to 1.3 mg./ml. or less, and separating the thus-precipitated virus.

9. A method according to claim 8 in which the virus is an attenuated strain from the influenza group.

10. A method according to claim 8 in which the virus is $M.$ $influenzae$-A.

11. A method according to claim 8 in which the bivalent metallic cation is calcium, magnesium, barium or cobalt or a mixture thereof.

References Cited

UNITED STATES PATENTS

| | | | |
|---|---|---|---|
| 3,105,012 | 9/1963 | Brandon et al. | 195—1.5 |
| 2,445,301 | 7/1948 | Chambers | 424—89 |
| 3,117,061 | 1/1964 | Grafe | 424—89 |
| 3,316,153 | 4/1967 | Van Frank | 424—89 |

RICHARD L. HUFF, Primary Examiner

U.S. Cl. X.R.

195—1.5